United States Patent [19]

Bergman et al.

[11] Patent Number: 4,935,078

[45] Date of Patent: Jun. 19, 1990

[54] HIGH THROUGHPUT MAILING MACHING TIMING

[75] Inventors: Norman J. Bergman, Danbury; Donald T. Dolan, Ridgefield; Peter C. DiLiulio, Bridgeport; Morton Silverberg, Westport, all of Conn.

[73] Assignee: Pitney Bowes Inc., Stamford, Conn.

[21] Appl. No.: 291,483

[22] Filed: Dec. 28, 1988

[51] Int. Cl.[5] .............................................. B65G 69/00

[52] U.S. Cl. ...................................... 156/64; 156/360; 156/364; 156/441.5; 177/1

[58] Field of Search ........................ 53/266 A, 383, 52; 156/362-364, 350, 277, 360, 441.5, 442.2; 177/1

[56] References Cited

U.S. PATENT DOCUMENTS

| | | | |
|---|---|---|---|
| 3,737,158 | 6/1973 | Beery et al. . | |
| 3,877,531 | 4/1975 | Storace et al. . | |
| 3,981,493 | 9/1976 | Klappenecker et al. . | |
| 4,106,972 | 8/1978 | Caudill | 156/363 |
| 4,143,981 | 3/1979 | Hansen et al. . | |
| 4,318,540 | 3/1982 | Paananen et al. . | |
| 4,331,328 | 5/1982 | Fasig . | |
| 4,451,027 | 5/1984 | Alper . | |
| 4,573,673 | 3/1986 | Haug . | |
| 4,573,673 | 3/1986 | Haug . | |
| 4,579,054 | 4/1986 | Buan et al. . | |
| 4,753,432 | 6/1988 | Freeman . | |
| 4,844,758 | 7/1989 | Hamamura | 156/363 X |

*Primary Examiner*—David Simmons
*Attorney, Agent, or Firm*—Charles G. Parks, Jr.; David E. Pitchenik; Melvin J. Scolnick

[57] ABSTRACT

A mailing machine for high-speed processing of mixed mail, capable of high throughput, and of compact size. It includes mail piece processing at four main stations in a straight-through manner, under positive control at all times by separate drive units at each station, with the sequential processing actions timed to optimize mail piece throughput.

28 Claims, 11 Drawing Sheets

MMP MOTOR CONTROLLER SOFTWARE HIERARCHY

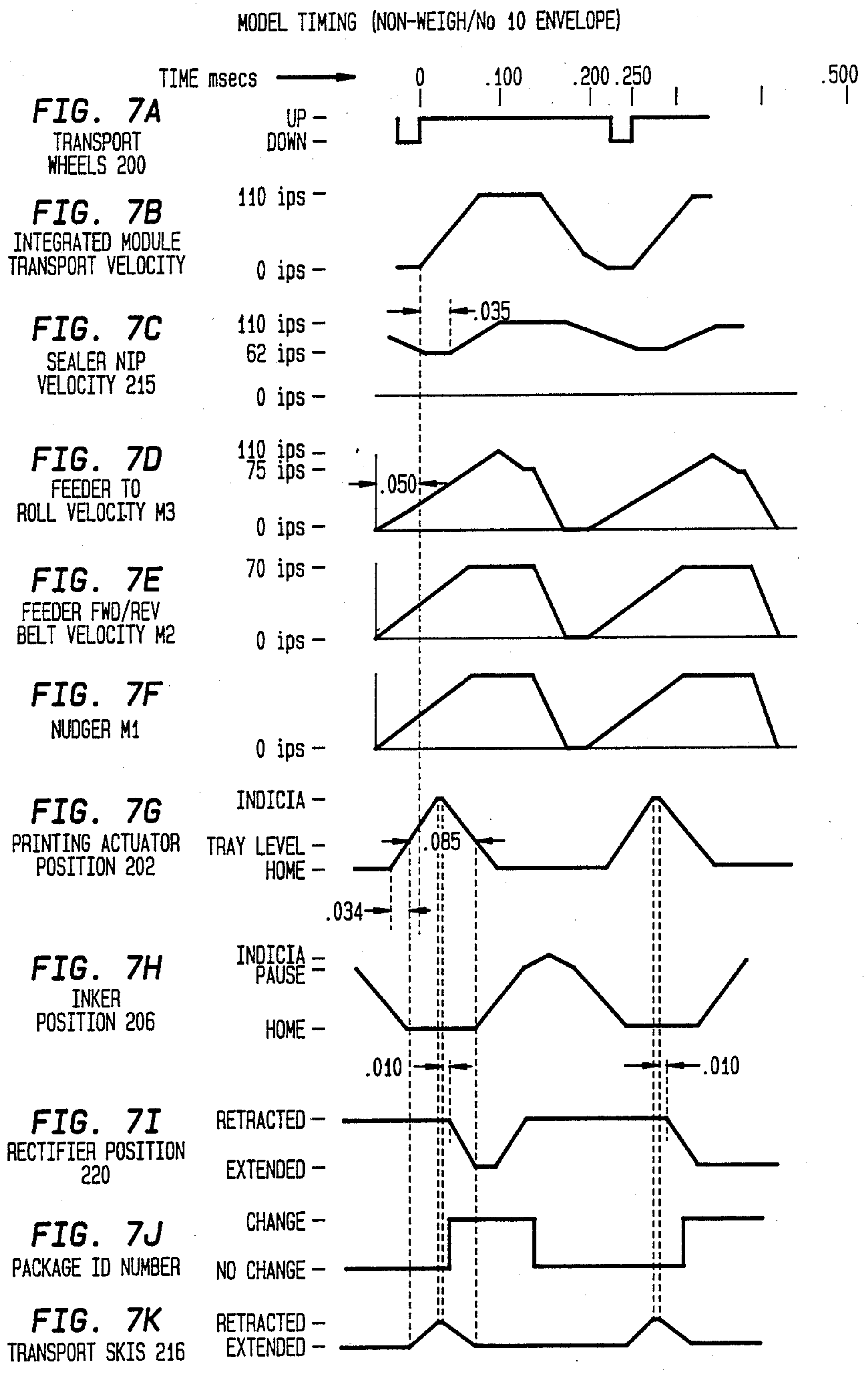
MODEL TIMING (NON-WEIGH/No 10 ENVELOPE)
TIME msecs
0
.100
.200
.250
.500
FIG. 7A
TRANSPORT WHEELS 200
UP
DOWN
FIG. 7B
INTEGRATED MODULE TRANSPORT VELOCITY
110 ips
0 ips
FIG. 7C
SEALER NIP VELOCITY 215
.035
110 ips
62 ips
0 ips
FIG. 7D
FEEDER TO ROLL VELOCITY M3
110 ips
75 ips
.050
0 ips
FIG. 7E
FEEDER FWD/REV BELT VELOCITY M2
70 ips
0 ips
FIG. 7F
NUDGER M1
0 ips
FIG. 7G
PRINTING ACTUATOR POSITION 202
INDICIA
TRAY LEVEL
HOME
.085
.034
FIG. 7H
INKER POSITION 206
INDICIA
PAUSE
HOME
.010
.010
FIG. 7I
RECTIFIER POSITION 220
RETRACTED
EXTENDED
FIG. 7J
PACKAGE ID NUMBER
CHANGE
NO CHANGE
FIG. 7K
TRANSPORT SKIS 216
RETRACTED
EXTENDED

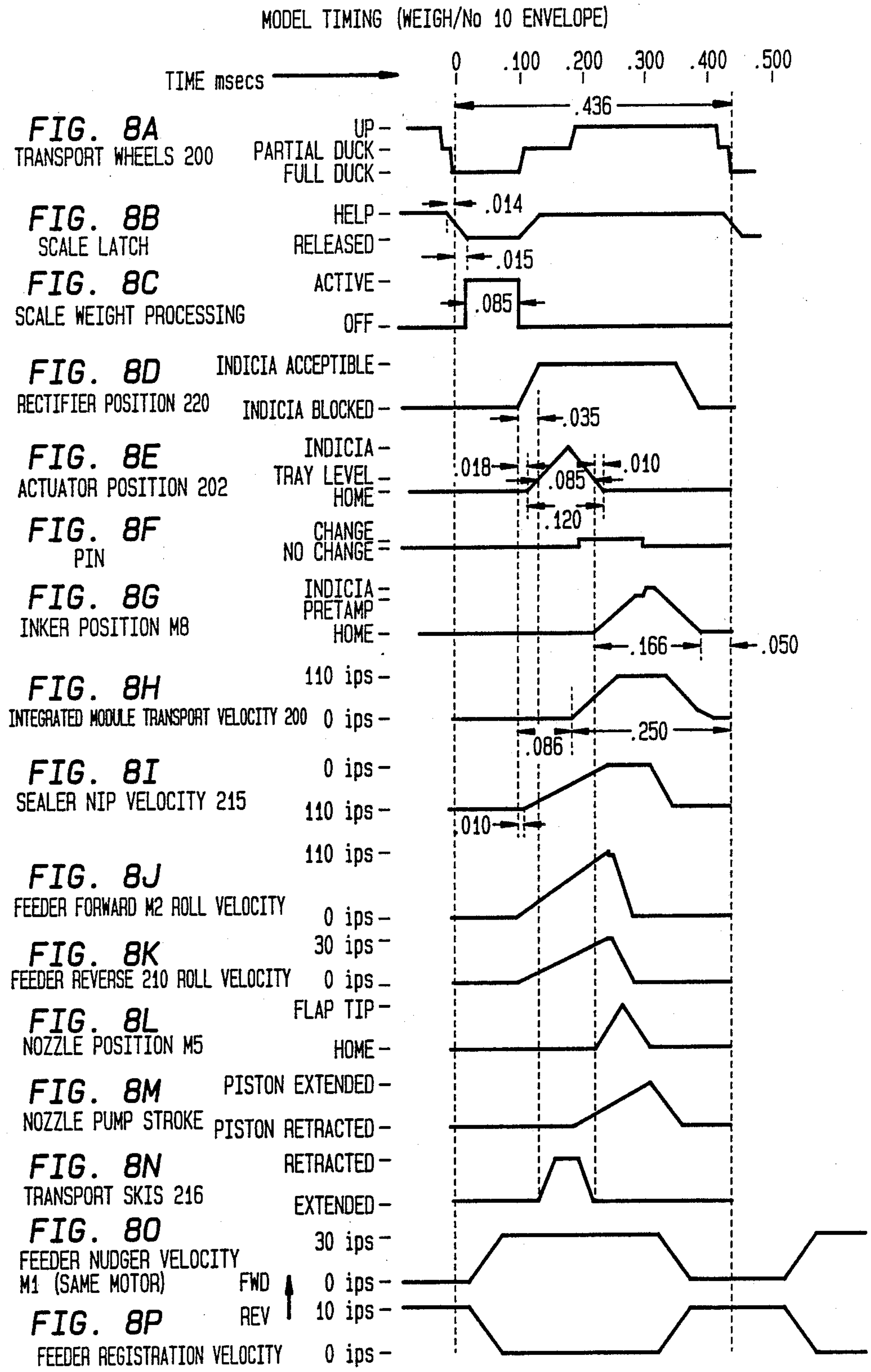
MODEL TIMING (WEIGH/No 10 ENVELOPE)
TIME msecs
0 .100 .200 .300 .400 .500
.436
FIG. 8A
TRANSPORT WHEELS 200
UP
PARTIAL DUCK
FULL DUCK
FIG. 8B
SCALE LATCH
HELP
RELEASED
.014
.015
FIG. 8C
SCALE WEIGHT PROCESSING
ACTIVE
OFF
.085
FIG. 8D
RECTIFIER POSITION 220
INDICIA ACCEPTIBLE
INDICIA BLOCKED
.035
FIG. 8E
ACTUATOR POSITION 202
INDICIA
TRAY LEVEL
HOME
.018
.085
.010
.120
FIG. 8F
PIN
CHANGE
NO CHANGE
FIG. 8G
INKER POSITION M8
INDICIA
PRETAMP
HOME
.166
.050
FIG. 8H
INTEGRATED MODULE TRANSPORT VELOCITY 200
110 ips
0 ips
.086
.250
FIG. 8I
SEALER NIP VELOCITY 215
0 ips
110 ips
.010
FIG. 8J
FEEDER FORWARD M2 ROLL VELOCITY
110 ips
0 ips
FIG. 8K
FEEDER REVERSE 210 ROLL VELOCITY
30 ips
0 ips
FIG. 8L
NOZZLE POSITION M5
FLAP TIP
HOME
FIG. 8M
NOZZLE PUMP STROKE
PISTON EXTENDED
PISTON RETRACTED
FIG. 8N
TRANSPORT SKIS 216
RETRACTED
EXTENDED
FIG. 8O
FEEDER NUDGER VELOCITY
M1 (SAME MOTOR)
30 ips
FWD
0 ips
REV
10 ips
FIG. 8P
FEEDER REGISTRATION VELOCITY
0 ips MODEL TIMING (WEIGH/RATE CHANGE/No 10 ENVELOPE)
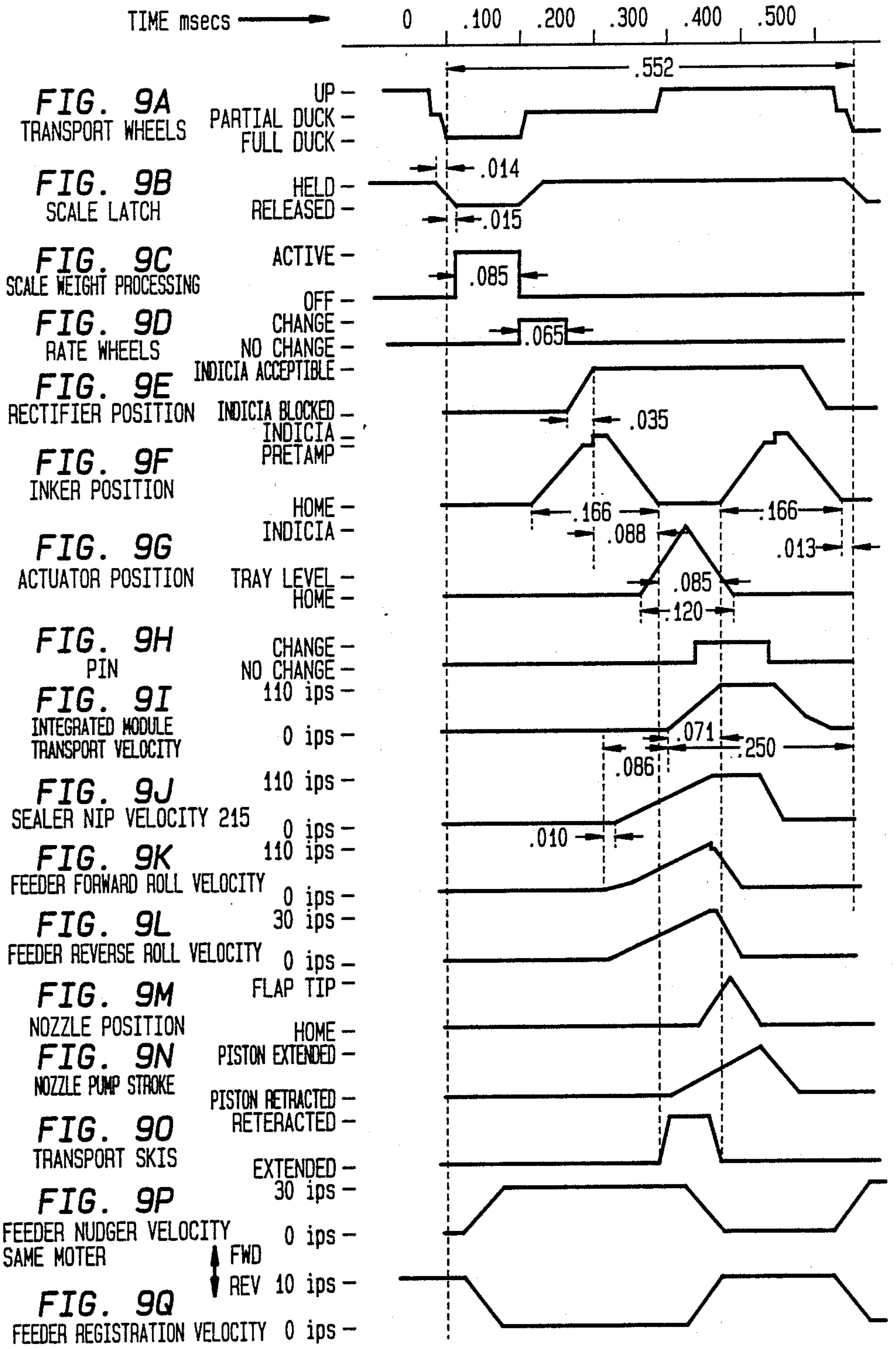

FIG. 10
(HEAVY ENVELOPE/TRANSPORT WHEEL 200)
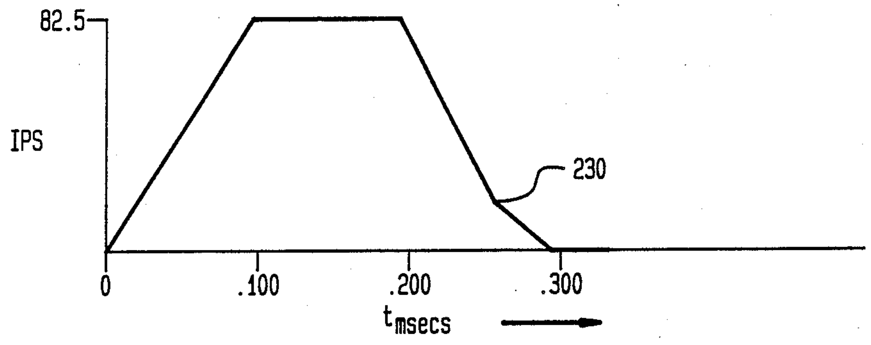
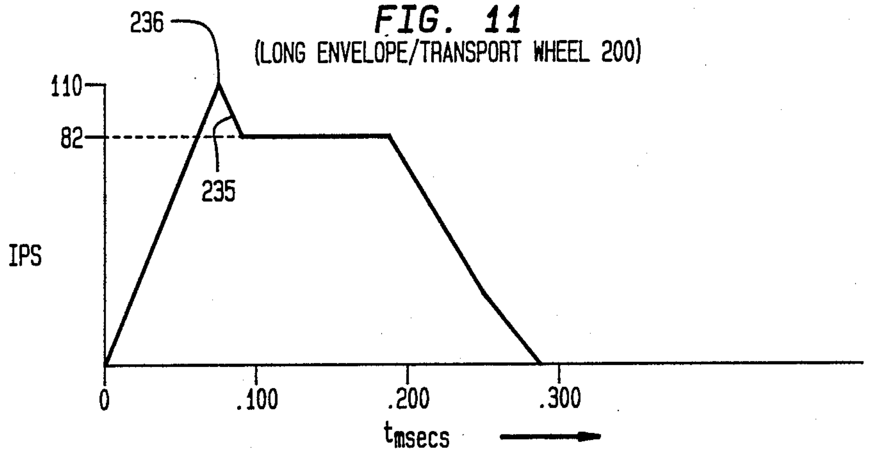
FIG. 11
(LONG ENVELOPE/TRANSPORT WHEEL 200)

MODEL TIMING (NON-WEIGH/VARIABLE SIZE ENVELOPE)
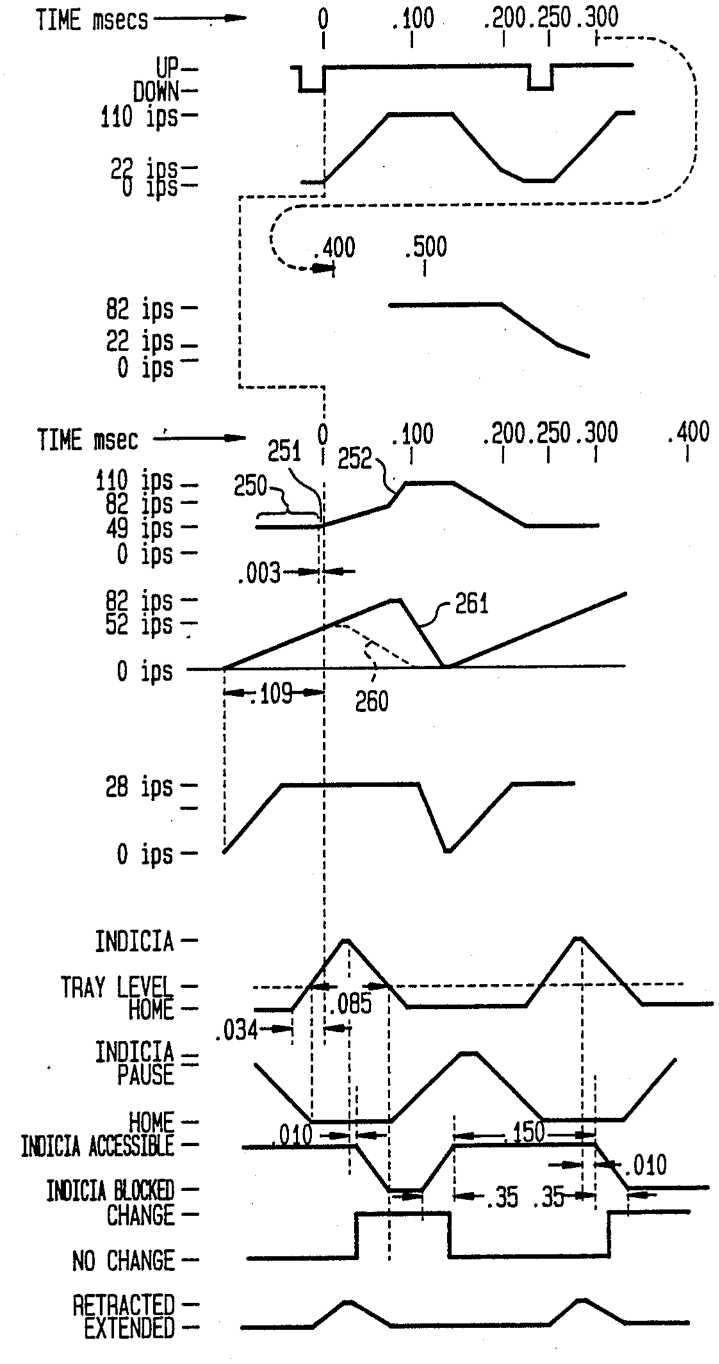
FIG. 12A TRANSPORT WHEELS
FIG. 12B INTEGRATED MODULE TRANSPORT VELOCITY
FIG. 12B' INTEGRATED MODULE TRANSPORT VELOCITY
FIG. 12C SEALER TRANSPORT VELOCITY
FIG. 12D FEEDER FWD/REV/T.O.
FIG. 12E NUDGER
FIG. 12F PRINTING ACTUATOR POSITION
FIG. 12G INKER POSITION
FIG. 12H RECTIFIER POSITION
FIG. 12I PACKAGE ID NUMBER
FIG. 12J TRANSPORT SKIS

HIGH THROUGHPUT MAILING MACHING TIMING

FIELD OF THE INVENTION

This invention relates to mail-handling machines, and in particular to a mailing machine capable of handling mixed mail and capable of high-speed processing of mail pieces.

BACKGROUND OF THE INVENTION

Automatic mailing machines typically include imprinting systems, such as a postage meter, where the information imprinted on the envelope or other sheet-like median is attributable to a variable parameter of the median, such as imprinting a postage value indicia on an envelope wherein the postage value is based on the weight of the envelope.

In the mail processing field, it is desirable for a system operator to be able to deliver to mail processing equipment a batch of "mixed mail," that is, the batch is comprised of a large number of envelopes of varying dimensions, and variable thickness or weight. The ability of a mail processing system to process a large variety of mixed mail eliminates the need of the system operator from performing a preliminary step of presorting the mail. It is further desirable for mail processing equipment to be able to weigh the individual envelopes and affix the appropriate postage value indicia in accordance with the envelope weight. It is generally considered advantageous if the mail processing equipment can imprint a quality indicia upon envelopes varying in thickness from that of a postcard to approximately three-quarters ($\frac{3}{4}$) of an inch.

It is known a provide mail processing equipment comprised of a feeder for singularly delivering envelope in series to a transport assembly. The transport assembly deposits the envelope on a scale for weighing. After a sufficient time to assure a true scale reading of the envelope weight, commonly referred to as "weigh on the pause," the transport assembly again assumes control over the envelope and delivers the envelope to a so-called mailing machine. Such a mailing machine is most commonly comprised of an integral transport assembly and attached rotary print drum type postage meter. The mailing machine transport assembly assumes speed control over the envelope performing any necessary speed adjustments to the envelope required to match the envelopes traversing speed with the imprinting speed to the postage meter print drum to promote a quality indicia print. It is known for the postage meter to include a value setting mechanism and to adjust the postage meter printing mechanism for printing of the appropriate postage rate on the approaching envelope according to the envelope weight as determined by the scale. Reference is made to commonly-assigned U.S. Pat. No. 3,877,531 which describes in greater detail a prior art automatic mail handling machine.

It is desirable to provide a mail processing system as depicted above with (i) the capability to process a dimensionally wide variety of envelopes including thickness or weight, (ii) to do it as fast as possible in terms of envelope per second, (iii) while applying a quality postage indicia. The known mail processing systems has several limiting factors with respect to increasing throughput relative to system cost. One such limiting factor is represented by the time required in transporting the envelopes from one process station to another. Another limiting factor is reflected in the time necessary to obtain an accurate weight from the scale. While such factors as transport time and weighing time can conceivably be decreased by incorporating advanced system techniques, the rule of diminishing returns predicts that small improvements in system throughput by such an incorporation would be achievable at disproportional increases in system costs.

One possible alternative means of increasing the throughput of such mail processing systems is to provide multiple scales and a suitable transport system such that the scales are placed in alternate use. Such an arrangement would conceivably allow overlapping of system process or function to achieve a significant increase system through. However, such an alternative represents added cost from both an equipment and system complexity standpoint.

SUMMARY OF THE INVENTION

It is an objective of the present invention to provide a postage meter mailing machine having an increased throughput capability.

Another object of the invention is a mailing machine that can handle mixed mail at a high speed.

A further object of the invention is a full-function, high-throughput mailing machine of compact size.

Briefly stated, these objects are achieved with a mailing machine according to the invention having one or more of the following features:

1. Subdivision of the machine into four basic units, comprising in order a feeder station, a singulator station, a sealer station, and an integrated weigher/printer station.

2. The provision of independently controllable transport means for each of the four basic units.

3. Combining of necessary functions into some or all of the basic units.

4. Configuring the various units and their assembly to provide positive drive control of the envelopes at substantially all times.

5. Providing sensors at propitious locations to monitor envelope flow and various machine actions.

6. Timing of the operations of the basic units so that, in many instances, actions at downstream stations are begun well before the envelope to be processed arrives to reduce the time needed to process the envelope.

DESCRIPTION OF DRAWINGS

These and other objects and advantages of the invention will be better understood from the detailed description that follows of a preferred embodiment of the mailing machine of the invention, taken in conjunction with the accompanying drawings wherein:

FIGS. 7-9 are waveforms showing velocity profiles and component positions during the time period of processing of one envelope.

FIGS. 10 and 11 are velocity profiles for the integrated module transport wheels for heavier and longer envelopes, respectively, for comparision with FIG. 7B;

FIG. 12 is another series of timing waveforms indicating changes in the velocity profiles to accommodate differently-sized envelopes.

DETAILED DESCRIPTION OF PREFERRED EMBODIMENT

Figure 1:
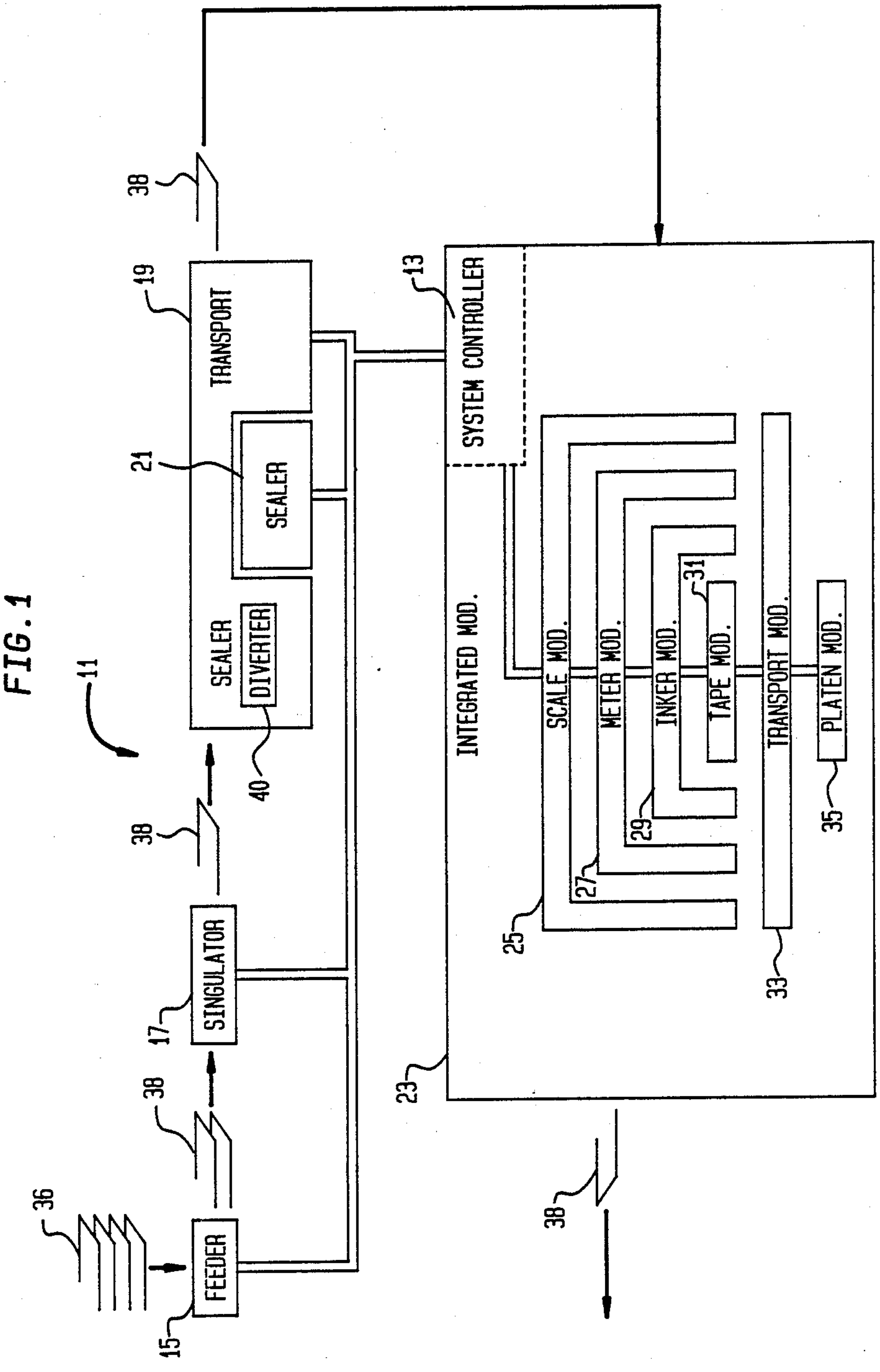
FIG. 1 is a schematic view of one form of mail-handling machine in accordance with the invention.

Referring now to FIG. 1, the preferred embodiment of a mail processing system according to the invention, generally indicated as 11, is comprised of a plurality of stations preferably as modules, under the control and influence of a system controller, generally indicated as 13. The stations or individual modules are an envelope feeder module 15, a singulator module 17, a sealer module 19 which includes a sealer 21, and what is here referred to as an integrated module 23. The integrated module is comprised of a scale or weigher module 25, a meter module 27, an inker module 29, optionally a tape module 31, a transport module 33 and a platen module 35. The integrated module is so referred to because the individual modules are mounted in a single housing. Each module includes the appropriate mechanism to perform a mail processing function.

Generally, the feeder module 15 receives an envelope stack 36 and, in the preferred embodiment, includes suitable mechanisms to shingle the bottom portion of the mail stack 36. The singulator 17 is charged with the function of extracting a bottommost envelope 38 from the now partially shingled envelope stack 36 in a seriatim manner and delivering the envelope 38 to the sealer transport module 19. The sealer transport 19 is charged with the function of traversing the envelope 38 across the sealer module 21. The sealer 19 has the capability of determining the sealing state of the envelope 38, and includes a diverter arm 40 for stripping open closed but unsealed envelope flaps, for responding to the seal state of an envelope such that only unsealed envelopes 38 are subject to sealing by the sealer module 21, and for detecting mis-sealed envelopes. The sealer transport serves up the envelope 38 to the transport module 33 of the integrated module 23.

As aforementioned the integrating module 23 is comprised of a scale module 25, a meter module 27, an inker module 29, optionally a tape module 31, a transport module 33 and a platen module 35. The mailing machine transport module 33 receives the envelope 38 from the feeder transport 19 and delivers the envelope to the scale 25. The scale module 25 is charged with the function of weighing the envelope 38 and reporting the appropriate postage value as a function of its weight to the postage meter module 27 mounted to the mailing machine 23. The indicia printing method employed in the preferred mailing system is referred to in the art as flat bed indicia printing. In accordance therewith, as the envelope 38 rests upon the scale, subsequent to being weighed, the postage meter module 27 print elements are set to the appropriate value as a function of envelope 38 weight. The inker module 29 is then charged with the function of inking the indicia of the meter module 27. Subsequent to inking of the postage meter module print elements, the platen module 35 is charged with the function of bringing the envelope 38 into printing contact with the print elements of the postage meter module 27. After the envelope 38 has been imprinted by the postage meter module 27, the transport module 33 resumes control over the envelope 38 and ejects the envelope 38 from the mailing machine 23.

Figure 2:
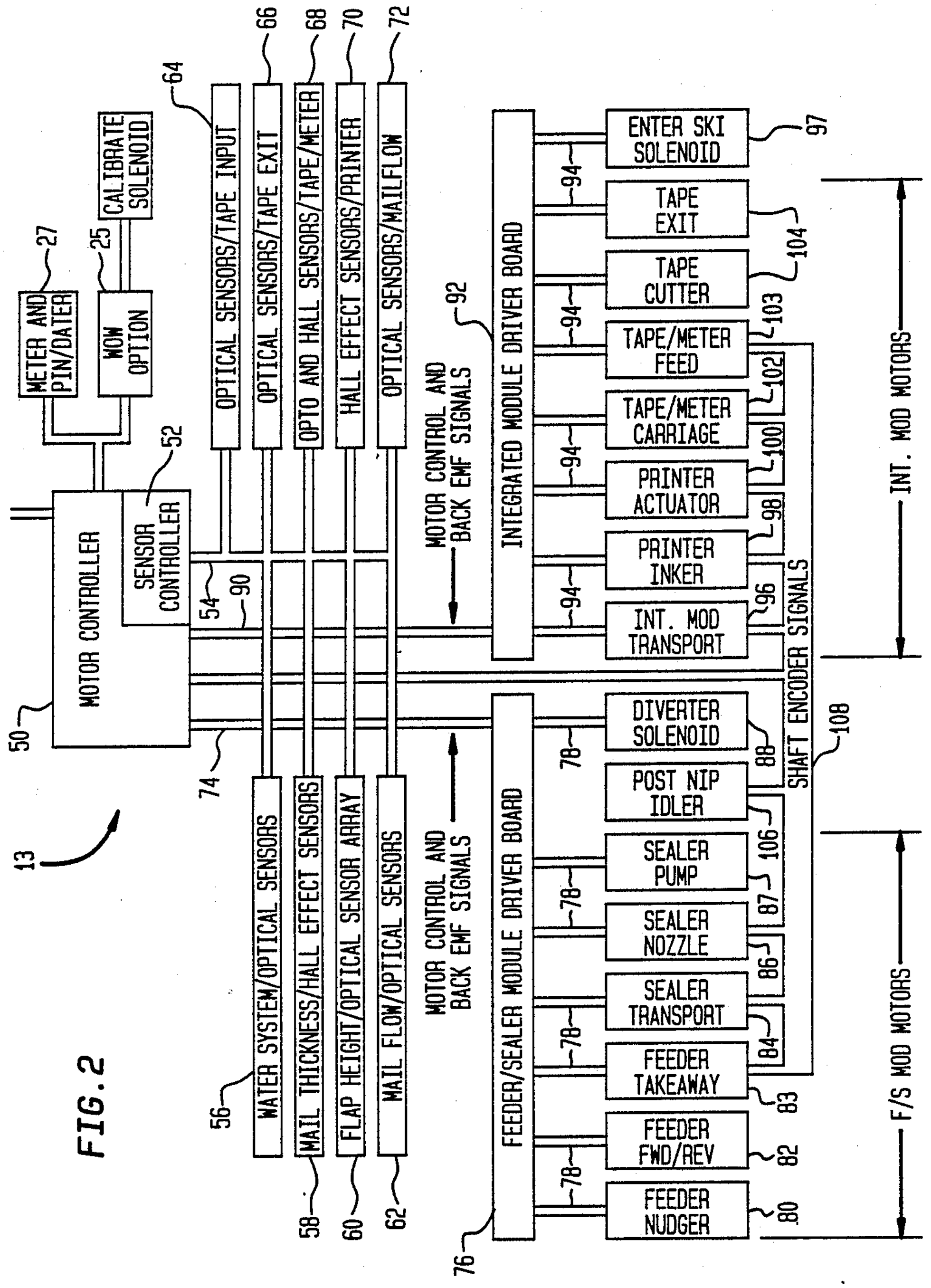
FIG. 2 is a system schematic illustrating how the various mail processing functions are activated and monitored.

Referring to FIG. 2, the controller system, generally indicated as 13, includes a programmable microprocessor motor controller 50 and a programmable microprocessor sensor controller 52. The motor controller 50 and sensor controller 52 are in direct parallel communication. Generally, the sensor controller 52 is programmed to poll each of a plurality of sensors located at various places in the machine and store the sensor information until called for by the motor controller 52.

A sensor bus 54 communicates the sensor controller 52 with a plurality of sensors and sensor banks, shown only schematically. For example, the sensor controller 52 is in bus 54 communication with a plurality of sensors and sensor banks associated with the various modules 15, 17, 19 and 23, such as: optical sensors 56 associated with a water system for the sealer module 21; Hall Effect sensors 58 associated with the singulator module 17 for determining the thickness of an envelope 38; an optical sensor array 60 for determining the flap configuration of an unsealed envelope 38 associated with the sealer module 21; mail flow optical sensors 62 associated with the respective feeder section modules 15, 17 and 19 for sensing the time-position of the envelopes 38 relative to the respective feeder section modules 15, 17 and 19; optical sensors 64 associated with the tape input to the tape module 31 and optical sensors 66 associated with the tape exit from the tape module 31; optical and Hall Effect sensors 68 associated with the tape module 31 motor drive system and meter module 27 loading drive system; Hall Effect sensor 70 associated with the platen module 35 drive system; and optical sensors 72 associated with the integrated module 35 for sensing the time-position of the envelope 38 within the integrated module 23.

It should be understood that suitable module assemblies acting under the motor influences is a matter of design choice. It should be further understood that the motor controller systems 13 will function cooperatively with any suitable mechanism system. The mechanism system here generally described is used for the purpose of illustration and sets forth the preferred environment for the subject invention.

The motor controller 50 communicates through a first bus 74 with a first motor driver board 76. The driver board 76 may be located within the integrated module 23. Alternatively, the feeder section modules 15, 17 and 19 may also be mounted in a single housing also housing the driver board 76. The driver board 76 in turn is in respective bus 78 communication with a plurality of motors associated with a respective feeder section modules 15, 17 and 19, such as, motor 80 associated with the feeder module 15, motors 82 and 83 associated with the singulator module 17, motor 84 associated with the sealer transport module 19, motors 86 and 87 associated with the sealer module 21, and a solenoid motor 88 which may be optionally associated with the diverter 40.

The motor controller 50 also communicates through a second bus 90 with a second motor driver board 92. The driver board 92, in turn, is in respective bus 94 communication with a plurality of motors associated with the modules 25, 27, 29, 31, 33 and 35 of the integrated module 23. For example, the driver board 92 through bus 94 communicates with motors 96 and 97 associated with the transport module 33, a motor 98 associated with the inker module 29, a motor 100 associated with the platen module 35, motors 102 and 103 associated with the tape/meter modules 29 and 31, and motor 10 associated with the tape module 29. It should be noted that a single driver board may be employed.

A plurality of the motors may include encoding apparatus enabling the respective motors to be under position servo-control of the motor controller 50, for example, motors 83, 84, 86, 96, 98, 100, 102, 103 and 106. An idler encoder mechanism 106 here associated with the singulator or the sealer transport module 19 is included to provide true speed data for a traversing envelope 38 to the motor controller 50. The respective motor encoders are in bus 108 communication with the motor controller 50. The motor controller 50 can also communicate with ancillary and/or auxiliary system, such as, the meter module 27 and the scale module 25.

In the preferred embodiment, the motor driver boards 76 and 96 are comprised of a plurality of channels. Each channel is associated with a respective motor and includes a conventional H-bridge amplifier responsive to pulse width modulated signal generated by the motor controller 50. Any of the desired motor may be subject to position servo-control and/or velocity servo-control as is well-known, the respective motor driver boards 76 or 92 channel further including a conventional EMF (Electro Motive Force) circuit for deriving the back EMF of the respective motor and communicating the back EMF to the motor controller 50 through the respective bus 94 or 90 or from which velocity information is obtained.

Figure 3:
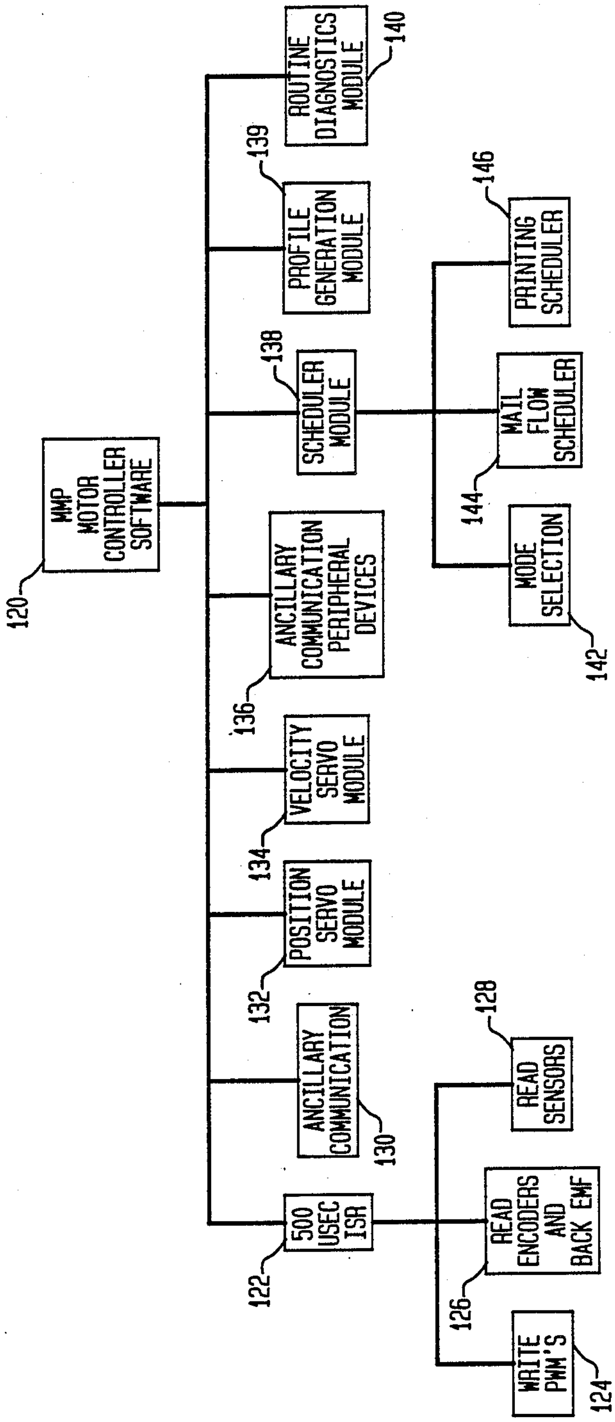
FIG. 3 is a data structure diagram illustrating one form of hierarchy of software modules suitable for driving the motor controller of the machine of FIG. 3.
Figure 4:
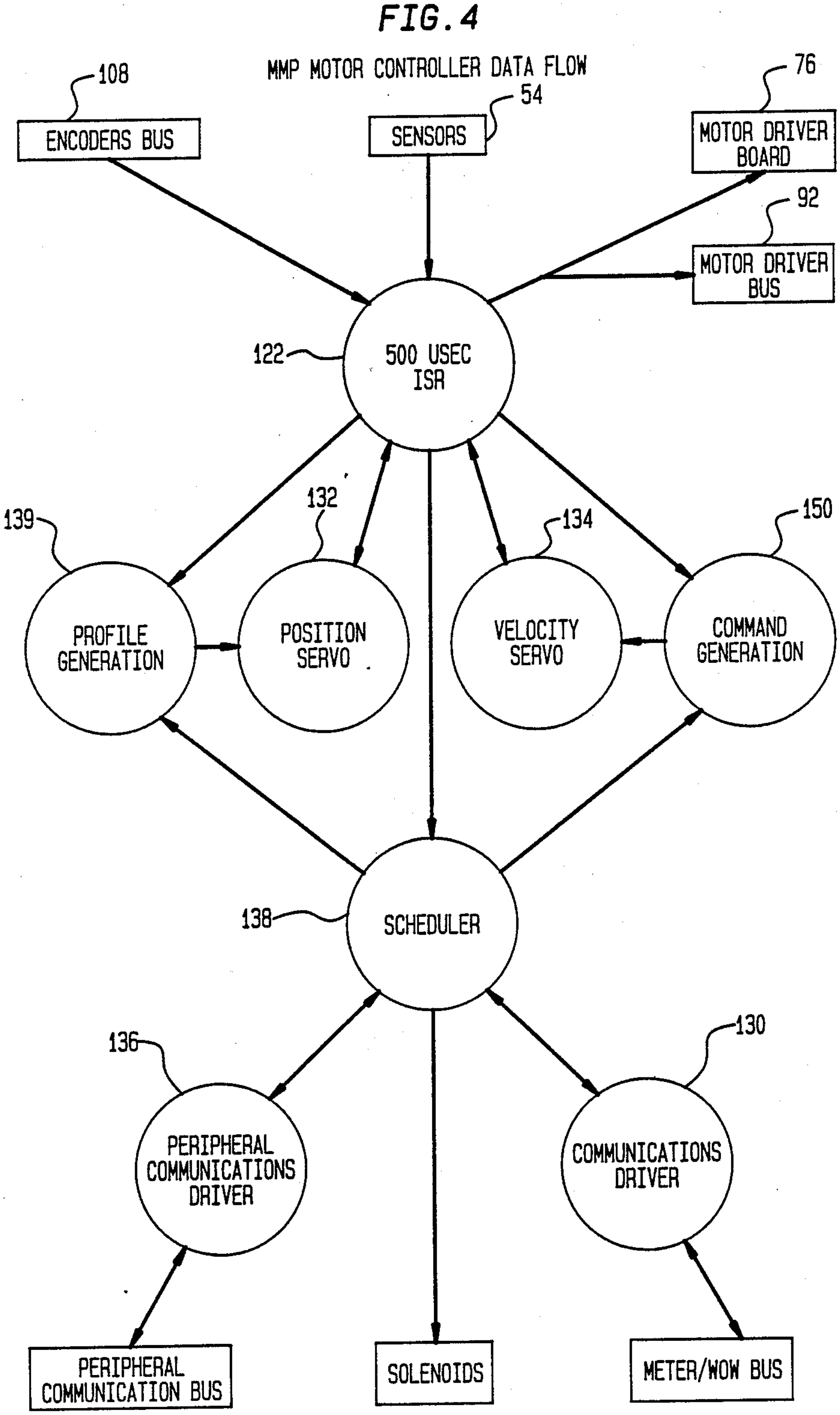
FIG. 4 is a data flow diagram for the motor controller of the machine of FIG. 3.

Referring more particularly to FIGS. 3 and 4, a suitable motor controller 50 software interfaces, generally indicated as 120, is configured modularly. The software includes a 500 μsec interrupt module 122 having submodules for generating motor PWM's, module 124, reading encoders and back EMF's, module 126, and reading sensor data from the sensor controller 52, module 128. The software further includes a communications module 130, position servo-control module 132, velocity servo-control module 134, an ancillary communication module 136, a scheduler module 138, a velocity profile generating module 139, and a diagnostic module 140. The ancillary communication module 136 can provide communications between the motor controller 50 and peripheral devices.

The scheduler module 138 is comprised of three submodules; a mode selection module 142, a mail flow scheduler module 144, and a print scheduler module 146. The mode selection module 142 will control the operation modes of the motor controller, i.e., communications, mail flow and printer schedulers modules. The mail flow module 144 will schedule any events relating to mail flow and the print scheduler module will handle scheduling of all events relating to postage printing on the envelope 18.

Referring to FIG. 4, the data flow is such that the interrupt module 122 receives data from the encoder bus 108 and sensor bus 54 and motor servo modules 132 and 134. The interrupt module 122 also transmits data to the motor driver boards 76 and 92, profile generations module 139, motor servo modules 132 and 134, and a subroutine 150 which generates servo commands. Subroutine 150 is a subroutine of module 134 and is intended to configure tracking motors such as motor 86.

The scheduler module 138 receives data from the interrupt module 122 and the communication modules 130 and 136. The scheduler module 138 transmits data to the profile generation module 139, command generation module subroutine 150, communication modules 130 and 136, and to the system solenoids 88 and 96. The communication modules 130 and 136 transmit and receive from appropriate communication bus.

Generally, the motor control system 13 is responsible for the activation and control of all motors and assemblies associated with the system modules. While mail processing includes the control of transport motors in the feeder, singulator, sealer, and integrated modules, mail processing may also include operator selectable functions. For example, in accordance with the mail processing system 11, the operation options are set forth in Table 1.

TABLE 1

MAIL PROCESSING OPERATING MODE MATRIX

| | PRINTING | SEALING | WEIGHING |
|---|---|---|---|
| FLOW ONLY | OFF | OFF | OFF |
| WEIGHT ONLY | OFF | OFF | ON |
| SEAL ONLY | OFF | ON | OFF |
| NO PRINT | OFF | ON | ON |
| PRINT ONLY | ON | OFF | OFF |
| NO SEAL | ON | OFF | ON |
| NO WEIGHT | ON | ON | OFF |
| FULL FUNCTION | ON | ON | ON |

Referring to the motor controller 50 central processor unit (CPU), loading is managed by programming the motor control 50 to sequentially perform a control cycle every 1 millisecond. It is appreciated that the cycle time can be adjusted to suit system requirements. Each control cycle is divided into a discreet time period T during which control functions are performed as noted in Table 2, also illustrated in FIG. 3.

TABLE 2

TIME CYCLE LOADING OF MOTOR CONTROLLER

| Time | Priority | Function |
|---|---|---|
| T1 | 1 | 500 usec Timer Interrupt/Read all encoders/Write motor configurations |
| T2 | 1 | Generate command routine for motor 86 |
| T3 | 3 | Execute position servo control routine for motor 86 |
| T4 | 2 | Enter communication mode with ancillary micro systems |
| T5 | 3 | Execute velocity servo control routine for motors 82 |
| T6 | 3 | Execute position servo control routine for motors 83 |
| T7 | 3 | Executive velocity servo control routine for 87 |
| T8 | 3 | Execute position servo control routine for motor 84 |
| T9 | 3 | Execute position servo control routine for motor 98 |
| T10 | 2 | Enter communication mode with ancillary micro-systems |
| T11 | 3 | Execute velocity servo control routine for motor 100 |
| T12 | 3 | Execute velocity servo control routine for motor 96 |
| T13 | 4 | Read all sensor inputs |
| T14 | 1 | 500 usec Timer Interrupt/Read all encoders/Write motor configurations |

TABLE 2

TIME CYCLE LOADING OF MOTOR CONTROLLER

| Time | Priority | Function |
|---|---|---|
| T15 | 3 | Generate command routine for motor |

TABLE 2-continued

| TIME CYCLE LOADING OF MOTOR CONTROLLER | | |
|---|---|---|
| Time | Priority | Function |
| | | 86 |
| T16 | 2 | Enter communication mode with ancillary micro systems |
| T17 | 3 | Execute position servo-control routine for motor 86 |
| T18 | 4 | Reserved for auxiliary micro-system bus communication routine |
| T19 | 4 | Enter Scheduler routine |
| T20 | 2 | Enter communication mode with ancillary micro systems |
| T21 | 4 | Execute motor profile generation routine |
| T22 | 5 | Execute Run-Diagnostic routine |
| T23 | 5 | Run background operation |

Each control period performs the specified control function and is prioritized. The routines range from 1 to 5, priority 1 being the highest priority. As the procedure executes in accordance with Table 2, if at any point a higher priority function requires additional processor time, the required time is appropriated from the lowest remaining priority function. For example, time may be appropriated from time interval 22 such that the Run-Diagnostic routines are not performed in the particular cycle.

It will be appreciated by one skilled in the art that the system controller for use with or application to high speed mail processing systems allows for substantial flexibility in configuring of a mail processing system. It will further be understood that th afore-described detailed description represents the preferred embodiment of the invention in the preferred system environment and that the motor control system heredescribed may be varied to suitably accommodate other application environments, and should therefore not be taken as limiting. For example, the two controllers may be consolidated into one, and the various motors reduced in number in order to reduce costs.

A generalized description of the manner in which the machine processes mail, and some of the factors involved in its design, constraints and performance will now be given to make clearer the description of the modules timing that will follow hereinafter.

Figure 5:
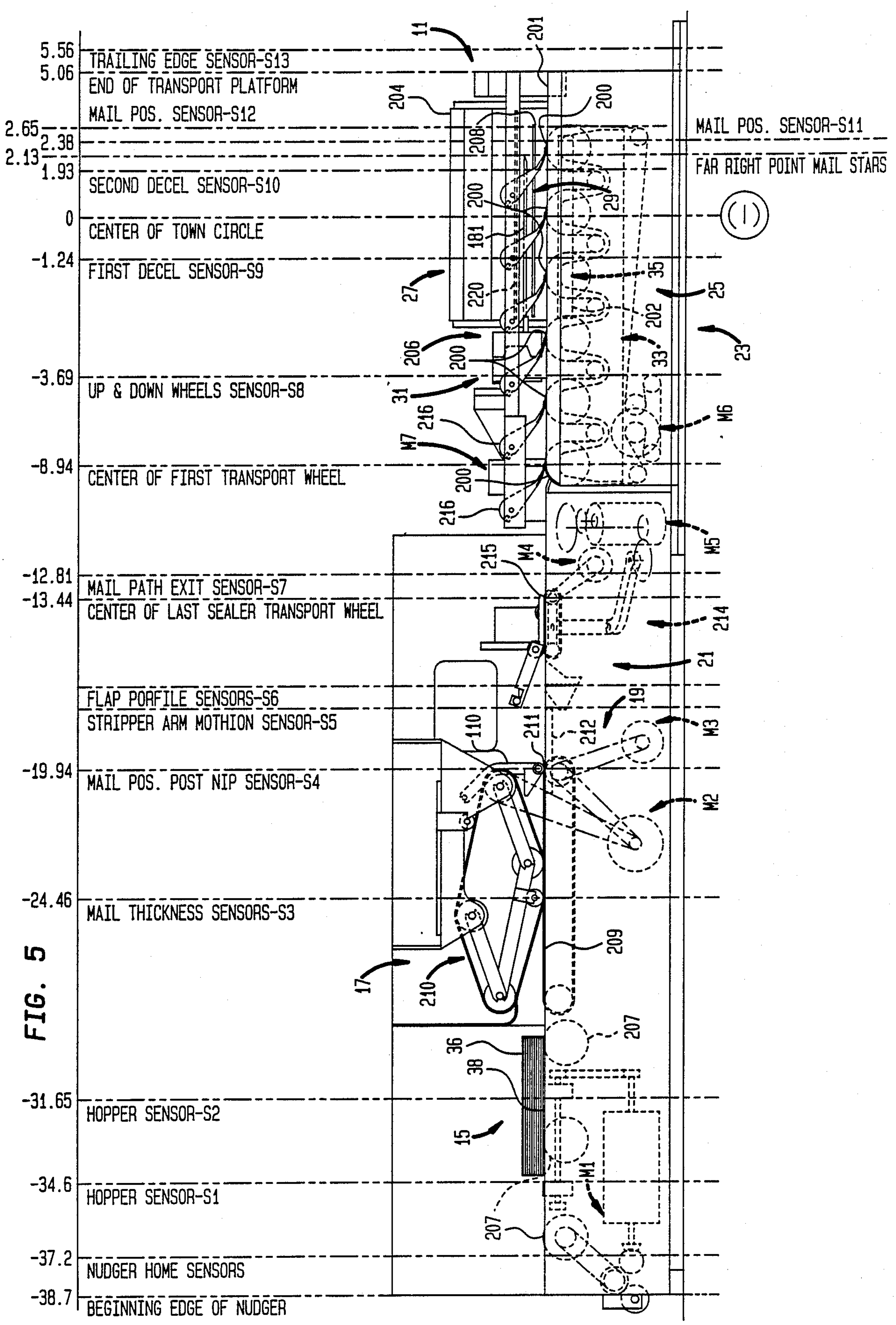
FIG. 5 is a side view of the mail handling machine of FIG. 1 wherein components involved in the machine's timing are indicated.
Figure 6:
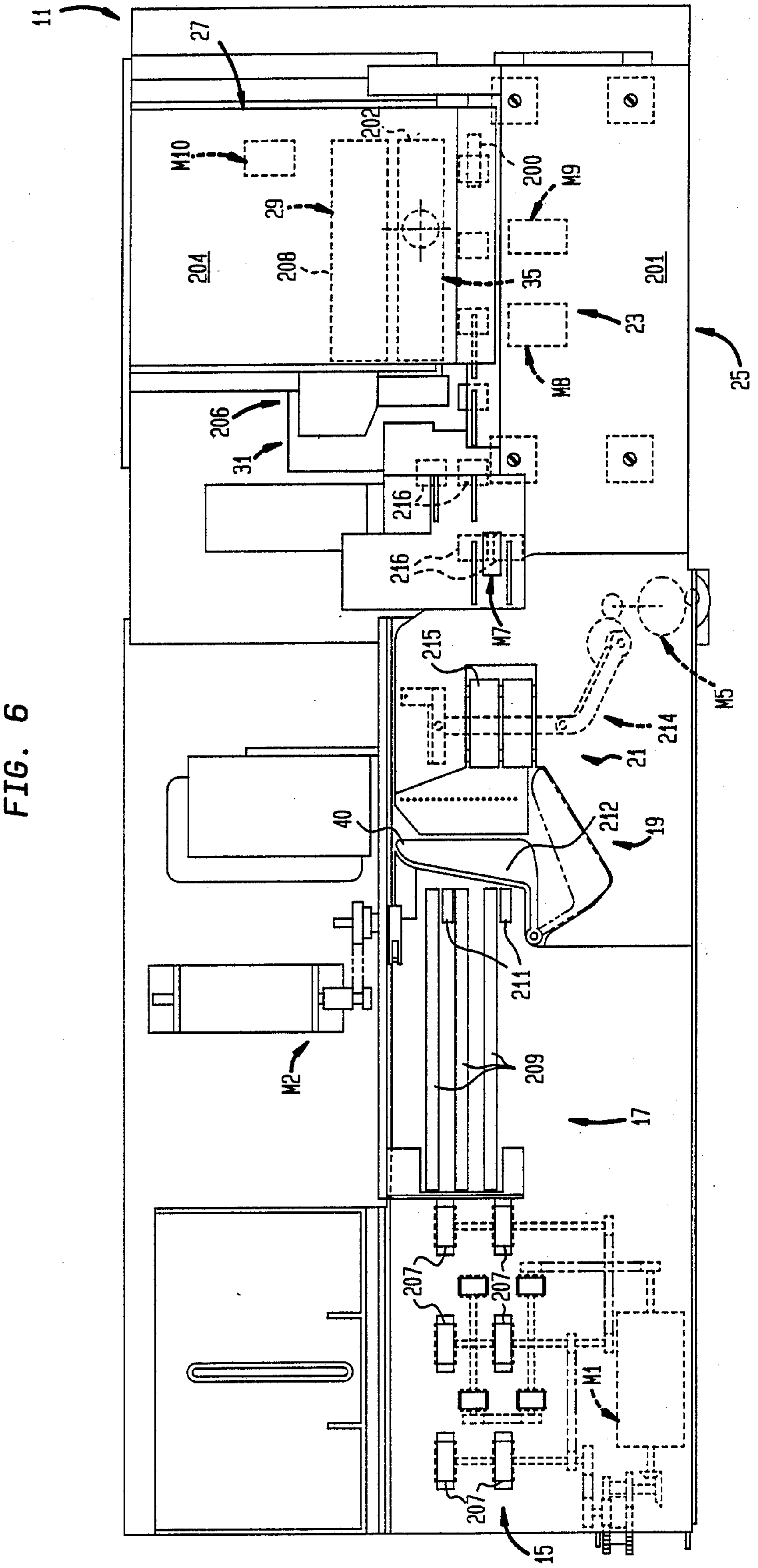
FIG. 6 is a top view of the machine depicted in FIG. 2.

Referring to FIGS. 5 and 6, inside the integrated module 23 is a transport assembly comprised of a plurality of rollers 200 independently supported by the mailing machine base in a manner which permits the rollers 200 to assume a vertically engaged position (up position) for contacting an envelope on the deck 201 above for transporting same, or a vertically disengaged position (down position) out of communication with the envelope. Each roller is aligned to journey through a respective slot in the deck. A bidirectional drive motor assembly M6 is in communication with each roller via an endless belt. The drive motor assembly includes a one way clutch interactive with the transport assembly such that motor actuation in one direction results in the endless belt imparting a forward driving force to each roller, and motor actuation in the opposite direction causes the transport assembly to reposition the rollers in its down position.

The sealing assembly is mounted in the mailing machine in a suspended manner over a leading portion cf the weighing plate of the scale and includes a plurality of sealing members selectively positionable in a first position, biased downward, to seal wetted envelope flaps, and in a second position in an upwardly retracted position for pre-sealed envelopes.

The mailing machine further includes a vertically displaceable platen assembly 202 mounted to the base of the mailing machine and aligned for cooperatively acting with a suitable postage meter 204 mounted above.

The tape module 206, if present, provides a tape track in a generally cantilevered manner to extend generally below and to one side of the meter module. The tape module can be selectively positioned in first position such that the tape track is locate longitudinally below and vertically between the printing means of the meter module and the platen assembly. In a second position of the tape module, the tape track is positioned longitudinally below and longitudinally in spaced relationship to the printing means of the meter module and the platen module. The tape module includes a tape feed which can selectively deliver to the tape track one of two types of tape for imprinting by the meter module.

The mailing machine further includes an inking mechanism for depositing ink on the meter print elements, which include an inking pad 206 which is moved into contact with the print elements.

At the upstream end of the machine, feeder rollers 207 activated by drive M1 carries the envelope into the singulator section 17, where they are forward driven by forward belts 209 controlled by drive M2 while a trapezoidal four-bar linkage 210 above is reversely driven to drive back all but the bottommost envelope. The envelope is then stopped under the linkage 110, its thickness measured by sensors there, and the envelope awaits activation of the take-out nip 211 for passing the envelope to the sealer section 21, where a stripper arm 212 strips open the flaps of unsealed envelopes and detects mis-sealed envelopes. The envelope flap profile is then recorded and used to control a moistener 214 downstream via spray from a motor-activated nozzle, and the envelope enters the sealer nip 215, just before entering the integrated module 23. In the integrated module, two so-called skis 216 can be selectively engaged or disengaged to the envelope top to apply vertical pressure. When engaged, the envelopes are driven forward; when disengaged, even if the transport wheels 200 are moving forward, the envelope remains stationary. The transport system properly positions the envelope on the weighing plate of the scale underneath the meter module 15. The transport rollers 200 are then caused to withdraw by reversely driving the motor M6 for the transport rollers. Simultaneously, the inking module 19 has been actuated to apply imprinting ink to the registration area of the postage meter module 15 and then withdrawn prior to the arrival of the envelope. Upon the arrival of the envelope in proper position at the weighing station and withdrawal of the transport rollers 200, the scale module weighs the envelope, in a manner described in copending application, Ser. No. 073,790, and informs the meter for meter setting, in a manner described in pending application, Ser. No. 114,358, filed Oct. 27, 1987, entitled PRINTWHEEL SETTING DEVICE FOR A POSTAGE METER. Subsequent to weighing of the envelope, the platen module 21 is actuated, in the manner as aforedescribed, to result in the imprinting of an indicia on the envelope. Simultaneously with actuation of the platen module 21 or pursuant to a minimum time lag, as will be later described, the transport rollers 200 can be reactivated or further activated to return the rollers 200 to their first position. Upon obtainment of the first position of the rollers, the envelope is discharged from the mailing machine. Simultaneously with commencement of discharge of the process station envelope from the process station, a new envelope may be received by the transport module 12.

Further, the optional capability is provided for imprinting an indicia on one of a plurality of tape median. The tape module 17 can be positioned for imprint of a indicia on one of two tapes carried by the tape module 17. The vertical elevation of the tape track is below the vertical position of the ink pad well such that the tape track 181 does not interfere with the operation of the inking module 17.

The meter print wheels, for security reasons, when not printing, are covered by retractors 220, sometimes referred to as rectifiers, which are moved out of position to expose the print wheels just before inking by the ink pad.

A more detailed description of the operation is given in conjunction with the various sensors indicated by the vertical lines in FIG. 5. The number at the top of the vertical lines represents the spacing of that line from a zero position known as the center of town position. Upstream spacings are negative; corresponds to the location of standard indicia imprinted on envelopes by postage meters. The relative dimensioning of the machine will be appreciated from the size of a standard No. 10 envelope, oriented horizontally or flat, with its short side leading, indicated at 38.

There are a number of sensors located at various positions within the machine, and those involved in the machine's timing are shown in FIG. 5. The others, which include, for example, sensors indicating home positions for an envelope flap tamper, the nudger, the water pump, the platen-actuator, the inker, are not shown, nor are shown such sensors as those for indicating water level, water spray and various meter security measures.

Referring now to those figures, two sensors S1 and S2 are located as shown in the hopper region for the first feeder section 15. The two sensors S1, S2 cover the hopper region and signal the controller that more envelopes need processing. The feeder forward drive 207 is controlled by motor M1. This drive when activated advances the envelopes in shingled fashion downstream toward the singulator section 17, while simultaneously nudging the envelopes against a rear registration wall.

the forward drive 209 for the singulation section is driven by motor M2 which is coupled to the four bar linkage 210 that is reverse driven to effect envelope singulation. The thickness measuring sensor S3 is connected to the four bar linkage. The takeaway nip 211 in the singulator section is driven by motor drive M3 or alternatively by the singulator drive M2. At approximately the same position is located a mail position sensor S4 for determining whether a mail piece is present at the takeaway nip.

The forward drive for the next sealing section 21 is designated 215, driven by motor M4 and is referenced as the sealer nip. A flap stripper blade 212 in the sealer is connected to a sensor S5 which indicates when the blade is moved. In the same section is located the unsealed-flap moistener 214, actuated by a motor drive M5. The latter is controlled by the flap profile generated by a profile sensor S6. The exit sensor for a mail piece from the sealer section is designated S7.

The forward drive in the integrated module 23 is designated M6. A number of sensors are associated with this module. A sensor S8 indicates whether the forward drive wheels 200 are up, which means that a mail piece present may be advanced, or down indicating that no advancement movement occurs. The action works with the two leading transport skis 216, which also can be positioned up, for no forward movement, or down for forward movement, actuated by motor M7. In addition, two spaced decelerate sensors (abbreviated decel) S9 and S10 are present, one at each side of the town circle center, which locates the position the envelope should occupy for proper printing. FIG. 5 also indicates th relative distances in inches the various components are spaced from the town circle center. Positions to the left are negative, and positions to the right are positive. The location indicated by the label "For Right Point Mail Stars" is the furthest downstream point of the printed indicia. The envelope must be positioned at least 0.5 inches downstream from this point for proper printing. Two mail position sensors S11 and S12 are located downstream of that point. The last sensor S13 detects the trailing edge of the imprinted envelope ejected from the machine.

Shown schematically are a motor drive M8 for the inker. In the preferred embodiment, the inker applies ink to the printer indicia just before each printing to the envelope. Printing takes place by raising the platen 202 supporting the weighed envelope by motor drive M9 and pressing it against the printer wheels, previously set by the weight information obtained from the scale. The meter is kept normally locked for security purposes by a set of retractors activated by motor drive M10. When an envelope is ready to be imprinted, the retractors are activated and withdrawn so printing can occur. After the printing, the retractors are activated to relock the printer.

In the preferred mode of operation, the operator places, say, two envelopes into the hopper section at the left end of the feeder 15. This trips the hopper sensors S1, S2 and the status is sent to the controller of the system. Once started the transport 207 moves the mail pieces into the singulator forward and reverse drive area. At this time, the mail is being singulated by the reverse drive belt 210 (during singulation the mail piece will lift up the four bar linkage mechanism which has an array of sensors S3 on it which will be used in determining the mail's thickness) and the forward drive belt 209 carries the first mail piece through the feeder until it trips the mail position post nip sensor S4. Once the sensor S4 has been tripped the feeder M2 is then decelerated to stop the first mail piece's lead edge one-half inch downstream of the sensor S4. Once stopped, this is considered the mail piece's feeder wait position. This is when the mail piece's thickness is measured, and at that point the thickness, along with a velocity profile, is sent t the controller.

At this time the feeder including the drive M3 for the take-out nip is awaiting a start command to be sen&: from the controller. Once the command is received, the feeder then carries the first mail piece into the sealer transport area and the second mail piece is fed into the four bar linkage area of the singulator and comes to rest in the feeder wait position.

The first mail piece is picked up by the first wheel of the sealer transport 215 and is carried through the sealer. If the detector arm 212 is moved by the advancing envelope, then a number of actions take place to determine whether the envelope may be mis-sealed and processing should stop to avoid jamming the machine. This is described in detail in the copending application Ser. No. 291,099, and need not be repeated. Assuming the mail piece is satisfactorily sealed, once the first mail piece's trailing edge trips the mail path exit sensor S7 (which is located ⅝" downstream from the center of the last sealer transport wheel) then the sealer is decelerated and then stopped. At this time the first mail piece is already 5" into the integrated module transport 23. When the leading edge of the first mail piece is 7.7" into the integrated modules transport, it then trips the first decel sensor S9 and the transport M6 starts rapidly decelerating. Prior to the first mail piece being seen by the second decel sensor S10, the meter retractors 220 are retracted and the feeder M2, M3 starts up to send the second mail piece into the system. When the first mail piece is 3.17" downstream from the first decel sensor S9, it then trips the second decel sensor S10 and the transport. M6 is gently decelerated to a stop. Just prior to the first mail piece coming to a stop, the inker completes its inking cycle. At this time the mail position diagnostic sensors are checked tc, see if the first mail piece has tripped either the first S11 or both the first S11 and second S12 position sensors. If the first mail piece is not seen by the first mail position sensor S11 (this is termed improper registration), then the transport is turned on to move up the first piece to trip that sensor. If the first sensor or both the first and second sensor have been tripped, then the platen-actuator M9 is allowed to continue its travel to print the indicia.

When the platen-actuator 202 starts returning to its home position, this notifies the controller that the print cycle is complete, and the meter 15 is sent a command to extend its retractors 220. When the platen-actuator 202 has dropped below the ink tray level, the transport M6 has reached its peak velocity to carry the first mail piece out of the system. While second mail piece has already entered the integrated modules transport, but its trailing edge has not been detected by the sealer's mail path exit sensor S7 to turn off the sealer transport. By the time the second mail piece has reached the mail position sensors S11, S12, the first mail piece has already exited the system.

The process is the same for the second mail piece until it exits from the system. After the second mail piece left the hopper area of the feeder, the hopper status of empty was sent to the controller. So when the second mail piece is exiting the system the trailing edge sensor S13 (which is located one half inch downstream from the end of the integrated module platform) is monitored. Once the sensor has seen the trailing edge of the second mail piece (which is also the last mail piece in the system) then the transport sends a message that mail processing is complete and the controller sends back a command to shut down the system.

Before proceeding with a description of the timing features of the invention, it will be helpful to elaborate on several principles underlying the present invention. As mentioned, high throughput of the machine is a major goal, as well as a small footprint. This is achieved by including one or more of the following features in the preferred embodiment of the invention:

1. The basic machine is divided into four main stations, which include: a first feeder section 15 for advancing mail pieces from a stack in a hopper section; a second singulator section 17 for singulating the mail pieces from the stacks and for measuring its thickness; a third sealer section 21 where properly-sealed envelopes are passed through, mis-sealed envelopes are detected, and unsealed envelopes whose flap is closed have their flap stripped open, a flap profile is generated for controlling the activation of a nozzle which sprays water to moisten the gummed flap, and the moistened flap is then adhered to the envelope; and a fourth integrated station 23 where the sealed envelope is weighed, the postage meter imprint wheels are inked, the envelope imprinted with the postage indicia, and the imprinted envelope ejected. A tape unit is optional and may or may not be included.

2. Each of the four basic stations have their own, independently controllable, transport or forward drive means.

3. The station configurations are such that the shortest mail piece when approaching the transition between stations will always be under positive control of at least one transport means, and when crossing a station transition will come under the control of the downstream transport means before exiting from the upstream transport means. For example, in FIG. 5, note that the size (length) of the envelope 38, a standard No. 10 is such that as it crosses from module to module, it always is under the control of at least one drive in the upstream module and usually also under the control of a second drive in the downstream module.

4. Essential functions have been combined at a single station to keep the overall footprint of the machine small. For example, at the feeder station, the forward drive is combined with a sideways registration motion; at the singulator station, singulation is combined with thickness measuring; at the sealing station, flap stripping is combined with mis-seal detection; at the integrated module, weighing is integrated with printing.

The result of this unique design is to substantially compress the overall machine length, but at the same time it enormously increases the problems of timing the envelope's passage through the machine for the desired high throughput. What this means is that actions at downstream stations must start in several instances well before functions have been completed at an upstream station. This is accomplished by the propitious location of sensors in the machine together with a programmed controller as previously described which controller will also react to the signals from the sensors to control the transport means at each of the stations.

One particular advantageous feature of the present invention is the relatively small size occupied by the mailing machine. It will be evident that a multiple module mailing machine, having a plurality of operating stations for performing various operations on mixed mail, requires particular drive speeds through each respective transport. Since the length of a piece of mail can vary from a low of 4 inches, as for a postcard, to a length of up to 15 inches for large scale mailing envelopes, the size of a mailing machine would be limited by the distance required of the largest document between respective stations which may be operating at individual speeds. Prior attempts to solve this problem of machine size have taken several approaches. For example, in application Ser. No. 134,492, filed on, the mail path is vertical. That is to say, mail is directed first in a downward direction, brought to a stop, and then reversed and brought back upward. As a result of folding the mail path, the total length of the machine is substantially reduced. However, difficulties in changing paper direction are self-evident, as are problems in alignment and requirements for assuring that diversion from a particular path is not impeded by the very mechanism through which the machine is feeding. In addition, change in paper direction effects speed, thereby putting a limit on the throughput of such equipment.

The preferred solution is a horizontal bed, allowing the mail piece to move in a single direction from input to output. The present invention overcomes the obstacle of machine size without compromising machine speed by employing several combinations of elements unique to the mailing machine of the invention. Thus, the weigher is a weigh-on-the-pause, wherein the mail is stopped. Timing of the operating is set up such that printing takes place at the same station as the weighing thereby taking advantage of the cessation of movement at the weigher, and not requiring two individual stopping procedures, one for weighing and one for printing in the throughput of the machine. In addition, the use of a flat bed rather than a rotary printer may also be employed since the mail has already been stopped, which further allows high speed operation. In addition, the use of overlapped modules rather than separate modules is employed. Thus, each module contains motor drives under separate control such that driving speeds between stations may be adjusted continuously to take into account different speeds at different modules. Thus, speed out of a first station may be adjusted for input speed into the next station by utilizing separate motors in constant communication by means of microprocessor communication systems. Common ratios of two motors can be established by means of table look-up functions for ratio adjustment or by preprogramming algorithms based on varying envelope size.

An additional feature which preferably is employed for speed control is measuring the thickness of the envelope with thickness sensing equipment, the thickness being a measure of piece in accordance with its measured thickness for appropriate envelope positioning to avoid edge-over printing, which results in the printing mechanism operating at a time period later for thicker envelopes than thinner, and thus allowing maximizing of speed, or of lengthening the cycle time to allow for the slower transport of thicker mail pieces. Each of the elements of the machine which include separate driving or movement functions may therefore be appropriately timed s that the distances between modules may be compressed. At the same time, the document passing through the transport is always under positive control, that is to say, specifically being pushed, pulled or otherwise driven in a positive manner at a preset or predetermined speed. This may require the motor drive of one station to adjust its speed in accordance with the motor drive of the next station downstream so that the mail pieces are always continuously driven and neither stretched nor compressed, causing inefficiency in the operation. By having the motors intercommunicating through microprocessor control, speed variations in accordance with specific timing dependent upon both the length and thickness of a mail piece may be taken into account.

One form of timing diagram for the preferred embodiment is illustrated in FIGS. 7 and 8. These diagrams apply to a Number 10 envelope, the most common envelope size. Other envelopes may require different timing for optimum results. This is easily accomplished by a suitable look-up table that stores drive profiles for different sized envelopes. The latter is readily determined by, for example, the controller looking at the state of the flap profile sensors S6, whose output would indicate the mail piece length, or at the mail path exit sensor S7 and measuring the time for the envelope's leading and trailing edges to pass this sensor. Knowing the velocity of the envelope would enable the controller to readily calculate the envelope length.

As mentioned, the envelope's procession through the machine is not continuous, but intermittent. For example, each envelope is brought to a full stop at the singulator post-nip position 211, at which time its thickness is measured and passed on to the controller, and the mail piece remains at that position until the preceding envelope is about to be imprinted, which means it has already reached the integrated module. Similarly, the envelope comes to a full stop on the scale while being weighed and then is lifted upward for printing, returned to the weigher deck or platform, and then ejected from the machine.

Envelopes undergo variable velocity transport determined by its weight, which in turn is based upon the thickness measurement by sensor S4. Thicker or heavier envelopes move slower than thinner, lighter envelopes. The thickness measuring sensor signal controls the velocity profile for transport, conveniently taken from a look-up table which has a separate velocity profile, preferably, mapped to each thickness or each range of thickness measurements. The range may be coarse, for example four covering the breadth of envelope thickness expected, or finer if desired.

Except for the sealer module, the section drives are turned on and off by the controller, and thus the velocity profile is typically a trapezoid. In the sealer module, the drive runs continually between low and high speeds.

There are several important features in the drive control associated with the preferred embodiment. When the envelope comes to a full stop in the singulator section 17, it is under the control of the forward drive motor M2 and the take-away nip motor M3. The timing can be chosen such that when the envelope is to be advanced, and while the envelope is still on the singulator forward drive belts 209 as well as the take-away nip roller 211, both the belts and the take-away roller are driven at the same velocity, but as soon as the envelope exits from the forward drive belts 209, the take-away nip roller's surface velocity is increased by about 10-25 percent. This ensures a minimum separation gap between successive envelopes, as described in application, Ser. No. 291,098. Alternatively, the surface speed of the take-away roller can always be maintained slightly greater than that of the forward drive belts. Similarly, since the scale used is of the type described in copending application, Ser. No. 408,015, in which the envelope is brought to a full stop on the scale before being weighed, and since printing occurs at the mail position occupied by the envelope, it is important to make sure that the various sized and weighted envelopes come to a full stop at the proper location. The decel sensors S9, S10 ensure this result. Moreover, thick mail pieces should preferably be imprinted at an envelope location that is more upstream than for regular envelopes. Hence, the thickness of the envelope controls the deceleration profile to ensure the above result.

In FIGS. 7 and 8, the abscissa is a linear common time line for all the waveforms in each figure. The waveforms will be readily understood by one skilled in the art, but for the sake of clarity, a few of the waveforms will be described in greater detail. In a typical cycle for an envelope, 0 time position has been established as a reference, and time values in terms of milliseconds (ms) ar measured with reference to the 0 position. The processing in FIG. 7 is for a non-weighing mode. A non-weighing mode means that all the envelope's have the same weight and therefore the postage meter wheels do not require a position change and a verify test, both of which are time consuming. The machine in the non-weighing mode can be programmed to process mail faster because no time need be allocated to postage meter printing wheel adjustment.

The time line on top of FIG. 7 gives the time in milliseconds, and the waveforms below, synchronized with the time line, indicate either position, change, or velocity, at different parts of the machine. The waveforms are drawn approximately to scale in relation to the time line.

In FIG. 7A, the transport wheels 200 had been down prior to time 0 for stopping the current envelope, and thus the forward velocity of the transport wheels 200 is zero (FIG. 7B). The current envelope is on the weigher scale; in the non-weighing mode, no weight information is passed. The inker (FIG. 7H) had already inked the meter print wheels, whose protective retractors 220 had been previously retracted (FIG. 7J). The platen actuator 202 (FIG. 7G) had already started its upward motion for the printing action before time 0. In FIG. 7K, the leading transport skis 216 were in their extending (driving) position and are starting to retract in order to decelerate the next envelope. The important features to recognize here are as follows:

1. Though printing of the current envelope has not been completed, the transport skis are already moving to handle the next envelope, and the transport forward drive is ramping up to maximum velocity (110 inches per second [ips]) in preparation for removing the current envelope at high speed when the platen actuator reaches its home position (and the envelope reaches the deck 201) approximately 100 ms after time 0. Moreover, when the transport 200 reaches maximum speed, it will at the right hand end be discharging the current envelope while simultaneously at the left hand end bringing the next envelope into printing position, and will not start decelerating until the first decel sensor S9 sees the leading edge of the next envelope.

2. The sealer nip velocity (FIG. 7C) which had slowed down to maintain an approximately 2-inch margin between successive envelopes (the current envelope is not yet advancing), will soon start ramping up to its maximum velocity for the next envelope.

3. Meanwhile, at the front end feeder unit 15, the forward drive M1 (FIG. 7F) is beginning to ramp up to its maximum speed, which, together with the singulator forward drive (FIG. 7E) and the singulator take-away nip, are accelerating to speed the next envelope through the machine.

4. Several of these actions are subject to sensor signals to track the envelope's progress. For example, in FIG. 7B, at the first arrow, the first decel sensor S9 has detected the leading edge (LE) of the next envelope, causing the transport drive M6 to start decelerating. At the second arrow, the second decel sensor S10 has detected the envelope's leading edge to stop the drive M6 to locate the next envelope at the desired printing location. In FIG. 7C, at the arrow, the mail path exit sensor has detected the next envelope's trailing edge (TE) and started its deceleration to its low speed mode.

The remaining motions and velocity profiles .will be evident to those skilled in the art from the waveforms given in FIG. 7. The operation is cyclical and will of course repeat so long as envelopes are in the machine to be processed. For optimum performance, the time relationships of some of the waveforms have also been indicated.

FIG. 7J requires special description. In certain foreign countries, sequential numbers have to be applied to successive mail pieces, and that waveform indicates the time during which the indicia is incremented (changed) for the next imprinting.

FIG. 8 shows the comparable timing waveforms for the same machine and for No. 10 envelopes but in a weighing mode, meaning that the envelope weights are not known, may be dissimilar, and the meter print wheels if necessary. In addition, no rate changes will be required, meaning all mail pieces processed will be of the same class, eliminating the need for a rate adjustment of the meter.

In addition, FIG. 8 includes the timing diagrams for several other components, for example, in FIGS. 8L and 8M, for the nozzle of the moistener; in FIG. 8B, for a scale latch—this is the weighing platform and during the time when it is released, the weighing is active in weighing the current envelope—see also FIG. 8C; in FIG. 8F, the curve labelled PIN indicates the time interval when the meter print elements are reset. FIG. 8, by comparison with FIG. 7, also shows the versatility of the machine, wherein a user selectable option—weigh mode—no rate change—will cause the controller to activate different functions within the machine and different velocity profiles and timing to take into account, for example, the additional printing time needed when the print wheels may need resetting for each current envelope. For example, one complete cycle of the machine in this mode requires about 436 ms, whereas in the no-weigh mode is FIG. 7, only about 250 ms is needed for each cycle. In addition, the inker waveform (FIG. 8G) has been refined and broken down into two phases, a pre-tamp phase where the ink pad waits before contacting the printer wheel until signalled by a sensor that any meter resetting has been completed (see PIN curve above)—the transition from charge to no-charge in FIG. 8F then reactivates the inker drive M8 causing the inker paid 206 to contact (tamp) the printer indicia.

Still further, FIG. 8A shows another variation when the transport wheels 200 can be made to occupy three positions—the up or full drive position, the partial duck or partial retraction which is a reduced drive position, and the full duck or full retracted position with zero drive.

As with FIG. 7, FIG. 8 depicts a snapshot of the system at the time that a current envelope rest on the weighing platform ready to be weighed. FIGS. 8A–8H show the processing of the current envelope. Thus, in FIG. 8H, the drive M6 is accelerating the transport wheels 200 for high-speed ejection of the stamped current envelope. Meanwhile, FIGS. 8I–8O show the processing of the next envelope upstream in the machine, which under acceleration of the sealer nip 215 (FIG. 8I) is just about to enter the integrated module 23 after having had its flap wetted and sealed (FIGS. 8L, 8M). When the next envelope arrives at its proper print location on the weighing platform, the cycle is repeated starting from time 0.

FIG. 80 also shows a velocity profile of a modified front end feeder construction wherein separate drives are used to advance the mail pieces downstream while simultaneously urging them against a registration wall.

FIG. 9 depicts the timing diagrams for still a third, user-selectable mode, weigh mode with a rate change.

In this case, the postage meter requires a dual motor control, one for setting the normal print wheels, and one for setting a rate change. Because of the increased functions, the cycle time has now increased to 552 ms. The major changes are in FIG. 9D, which allocates time for a rate wheel change, and FIG. 9F, showing the doubled ink pad movement required.

The foregoing illustrative sets of timing diagrams will make clear to those skilled in the art the necessary controller program adjustments to achieve the sequencing depicted therein, and will also enable those skilled in this art to provide other timings for handling differently sized and weighted envelopes to improve mail throughput.

As an example of the foregoing, FIG. 10 shows an appropriate transport wheel 200 velocity profile in the non-weigh mode for a heavier envelope than used to determine the timing in FIG. 7. As will be noted, the maximum velocity is reduced from 110 ips to about 82 ips, and the duration of maximum velocity has also been increased to ensure the envelope still reaches the correct printer position. The curve discontinuity shown at 230 indicates when the transport, which is servo-controlled, starts to decelerate more slowly so it comes down gracefully to zero and stops, because the system is incapable of servoing at negative velocities. The reduced speed for the heavier envelopes tends to reduce slippage and power consumption. A suitable rough speed control may be obtained by dividing the incoming mail pieces into two categories, the first for envelopes up to 3–4 ozs in weight, and the second for heavier envelopes, and providing just two velocity profiles to cover the entire range of envelope weights desired.

FIG. 11 shows an appropriate velocity profile of the transport wheels 200 for an envelope that is longer than that processed in FIG. 7. Because of the increased length, again the maximum velocity has been reduced to about 82 ips. Again, as will be observed from FIG. 11, the maximum velocity must be continued for a longer interval to ensure envelope stoppage at the correct location. The deceleration indicated by 235 results from the fact that the controller does not know that a longer envelope is being processed until after the integrated module transport velocity has accelerated past the reduced velocity level. But when the controller becomes aware from the sensors that a longer than normal envelope is being processed, during the next polling time it directs the drive M6 to decelerate, which it does along line 235 until the desired reduced maximum is achieved. As earlier mentioned, the data for effectuating such control is readily stored in a look-up table for speedy accessing by the controller.

As described in the copending application, Ser. No. 291,099, when the blade arm 212 is moved, indicating a possible mis-sealed envelope, the forward velocity of the sealer nip drive M4 is maintained in its slow speed mode (See FIG. 7C), which is about one-half of its normal value, for a short time period, say, about 40 ms, to determine whether the blade arm 212 has returned to its home position, indicating that the envelope is OK and can be normally processed. This will delay only slightly the normal machine processing. In this mode of operation, therefore, all forward drives of the machine are correspondingly reduced by about the same amount, so if it was preferably approximately 50% for the sealer nip, then it would be approximately 50% for the other forward drives.

In addition, with reference to FIGS. 7D and 7E, throughput may further be enhanced by adjusting the velocity profile of the singulator take-away nip drive M3 so that the surface speed at the latter is about the same as that of the singulator forward drive via belts 209 and motor M2 while the envelope is under the control of both forward drives, but when the trailing edge of the envelope leaves the belts 209, then the take-away nip velocity can be increased if desired to speed the envelope through the sealer module.

FIG. 12 shows several other waveforms to illustrate the versatility of the machine. For instance FIG. 12C illustrates a situation in which the envelope during the period indicated by 250 is under the control of the feeder alone, at 251 the envelope rendezvous' with the sealer transport, and remains under joint control until point 252, at which time the envelope exits the take-away nip and begins to approach the integrated module transport, and thus gets accelerated to the maximum velocity of 110 ips.

In FIG. 12A is indicated at 260, 261 the deceleration profiles for two differently-sized envelopes, the 260 for a short envelope and 261 for a longer envelope. The object is to ensure both sized envelopes stop about 2 inches downstream of the take-away roller, for thickness measurement and seal detection.

At FIG. 12B is shown the deceleration profile for a longer envelope whose maximum velocity was reduced to about 82 ips, to ensure the envelope stops at the proper printing position.

It will be understood that, in general, the thickest, largest envelope controls the machine's throughput. In other words, when the machine is slowed to handle the bigger mail piece, the one or two mail pieces behind would also be subject to the same slowdown until the bigger mail piece exits.

For completeness' sake, the feeder 15 is described in detail in copending application, Ser. No. 281,354 the singulator in copending applicastion, Ser. No. 291,098, the sealer 21 in copending application, Ser. No. 291,099, and the integrated module 23 in copending application, Ser. No. 408,015, the contents of which applications, as well as the other copending applications earlier referenced, are herein incorporated by reference.

While the invention has been described and illustrated in connection with preferred embodiments, many variations and modifications as will be evident to those skilled in this art may be made therein without departing from the spirit of the invention, and the invention as set forth in the appended claims is thus not to be limited to the precise details of construction set forth above or such variations and modifications are intended to be included within the scope of the appended claims.

What is claimed is:

1. A mail handling machine for processing mail pieces of varying size or thickness along a flow path and comprising:

(a) a front end feeder station including forward drive means at an upstream part of the flow path for mail pieces at said feeder station;

(b) a mail piece singulator station downstream to the feeder station and positioned to receive mail pieces from the feeder station and including:

(i) means for singulating the mail pieces to produce a single mail piece, and (ii) means for advancing the single mail piece in a downstream direction;

(c) a sealer station for moistening and sealing open gummed flaps on the envelope and positioned downstream to receive the single mail piece from the singulator station and including drive means for advancing the sealed envelope in a downstream direction;

(d) a postage printer station located downstream of the sealer and positioned to receive the sealed envelope and imprint postage value indicia on the envelope and including drive means for advancing the sealed envelope to the printer and for removing the imprinted sealed envelope;

(e) means for controlling the drive means in at least one of the downstream stations whereby said downstream drive means are activated for processing arriving mail pieces while they are still undergoing processing at an upstream station; and (f) means for dynamically controlling the drive means velocity in at least one of the downstream stations in accordance with the size of thickness of a mail piece.

2. A mail handling machine as claimed in claim 1 wherein the timing of the activation is such that the downstream drive means achieves maximum speed at about the time that the next upstream mailing piece is scheduled to arrive at the downstream station for processing.

3. In a high speed mail-handling machine capable of processing mail of varying size or thickness, said processing including at least means for transporting each mail piece to a weighing station and for weighing each mail piece and for printing indicia on each mail piece the improvement comprising means for dynamically controlling the transport velocity of a mail piece in accordance with its size or thickness.

4. A mail handling machine for processing mail pieces of varying size or thickness along a flow path and comprising:

(a) A mail piece singulator station positioned to receive mail pieces and including:

(i) means for singulating the mail pieces to produce a single mail piece, and (ii) drive means for advancing the single mail piece in a downstream direction:

(b) a sealer station for moistening and sealing open glued flaps on the envelope and positioned downstream to receive the single mail piece from the singulator station and including drive means for advancing the sealed envelope in a downstream direction;

(c) a postage printer station located downstream of the sealer and positioned to receive the sealed envelope and imprint postage value indicia on the envelope and including drive means for advancing the sealed envelope to the printer and for removing the imprinted sealed envelope;

(d) means for controlling the drive means to each of the stations whereby downstream drive means are activated for processing an arriving mail pieces while it is still being processed at an upstream station; and (e) means for controlling the drive means velocity in each of the stations in accordance with the size or thickness of mail piece.

5. A mail handling machine as claimed in claim 4 wherein the timing of the activation is such that the downstream drive means achieves maximum speed at about the time that the next upstream mailing piece is scheduled to arrive at the downstream station for processing.

6. A machine as claimed in claim 4 and further comprising, upstream of the singulator, a front end feeder station including forward drive means for advancing mail pieces downstream to the singulator.

7. A machine as claimed in claim 4 wherein means are provided for accelerating the printer station drive means while the envelope is being printed and before it reaches the drive means.

8. A mail handling machine for processing mail pieces of varying size and thickness along a flow path and comprising:

(a) a front end feeder station including forward drive means at an upstream part of the flow path for mail pieces at said feeder station;

(b) a mail piece singulator station downstream to the feeder station and positioned to receive mail pieces from the feeder station and including:

(i) means for singulating the mail pieces to produce a single mail piece, and (ii) drive means for advancing the single mail piece in a downstream direction;

(c) a sealer station for moistening and sealing open gummed flaps on the envelope and positioned downstream to receive the single mail piece from the singulator station and including drive means for advancing the sealed envelope in a downstream direction;

(d) an integrated weighing and postage printer station located downstream of the sealer and positioned to receive the sealed envelope, weigh it, and imprint postage value indicia on the envelope and including drive means for advancing the sealed envelope to the weigh and for removing the imprinted sealer envelope;

(e) means for controlling the drive means in each of the station whereby a downstream drive mean is activated for processing arriving mail piece while they are still at an upstream station; and (f) means for measuring the thickness of the mail piece, and controlling the drive means in accordance with measured thickness.

9. A machine as claimed in claim 8 wherein the thickness measuring means is located at the singulator station.

10. A mail handling machine as claimed in claim 8 further comprising means located at the sealer station for detecting a possibly mis-sealed envelope, said controlling means including means responsive to the detecting means for reducing the velocity of the sealer device means for a short period of time.

11. A mail handling machine as claimed in claim 8, wherein said controlling means includes means for stopping each mail piece at the singulator station.

12. A mail handling machine as claimed in claim 8, wherein said controlling mean includes means for timing the mail pieces flow through the machine such that when the integrated station drive means is active to remove the imprinted sealed envelope, the next mail piece comes under the control of said integrated station drive means.

13. A mail handling machine as claimed in claim 8, wherein the drive means are located in each of the stations such that each mail piece is continuously under positive control of at lease one of the drive means.

14. A mail handling machine as claimed in claim 13, wherein the drive means are so located that each mail piece is under positive control of two drive means in adjacent stations while passing from one of said adjacent stations to the other.

15. A mail handling machine as claimed in claim 8, wherein the singulator drive means includes upstream forward and reverse drive means and a downstream take-away nip, and the drive control means include means for maintaining said upstream and downstream drive means at the same velocity while a mail piece is under the control of both, and for increasing the velocity of the downstream drive means when said mail piece exits the upstream drive means.

16. A mail handling machine as claimed in claim 8, wherein the integrated station has a defined mail piece position for proper printing and two position sensors located upstream and downstream, respectively, of said defined position, said controlling means being responsive to signals from said sensors to control the integrated station drive means to stop each advancing mail piece at said defined position.

17. A mail handling machine as claimed in claim 16, wherein the integrated station also has an exit sensor, and the controlling means are responsive to a signal from the exit sensor to start deceleration of the drive means.

18. In a high speed mail-handling machine capable of processing mixed mail of varying thickness and size, said processing including at least the steps of transporting each mail piece to a weighing station and weighing each mail piece and then printing indicia on the weighed mail piece, the improvement comprising dynamically varying the transport velocity of each mail piece in accordance with its thickness or size while the mail piece is undergoing processing in the machine.

19. The process as claimed in claim 18 wherein the processing also includes singulating the mail and sealing the open flap of a mail piece before weighing step.

20. In a high speed mail-handling machine capable of processing mail of varying size or thickness, said processing including at least the functions of transporting each mail piece to a station and printing indicia on the mail piece, said processing including at least two user-selectable operating including a first non-weigh mode and a second weigh mode wherein each mail piece is weighed and the printed indicia reflects the envelope weight, the improvement comprising controlling the timing of functions performed on each mail piece in accordance with the mode selected by the user and in accordance with the size of thickness of the mailpiece.

21. The process as claimed in claim 20 wherein the functions further include singulating the mail, and sealing open flaps on each mail piece.

22. The process of claim 21 wherein the processing occurs seriatim in order of singulating, sealing, weighing, and printing, and wherein the functions to be applied to each mail piece are time-interleaved to increase mail piece throughput.

23. The process of claim 19 wherein the mail piece thickness is measured during the singulating step.

24. A method for processing mail pieces of varying size and thickness at high speed, comprising the steps:

(a) providing upstream and downstream processing stations, (b) presenting a mail piece to an upstream processing station for processing;

(c) while the mail piece is at the upstream processing station, activating processing means at the downstream processing station;

(d) after completion of processing of the mail piece at the upstream station, advancing the mail piece to the downstream station while the processing means therein remain activated to thereby reduce the processing time at the downstream station; and (e) adjusting the operating speed of the processing station at which the envelope is located in accordance with the size or thickness of the mail piece.

25. The method for processing mail pieces of varying size and thickness at high speed, comprising the steps:

(a) providing in the mail piece flow path processing stations for singulating, sealing, weighing and printing, (b) subjecting mail pieces to a singulating function;

(c) while the mail piece is still at a station; singulating, activating the sealing processing mean;

(d) after completion of processing of the mail piece at the singulating station, advancing the mail piece to the station for sealing while the processing means therein remain activated to thereby reduce the processing time at the sealing station, (e) while the mail piece is at the station for sealing, activating processing means at the station for weighing;

(f) after completion of processing of the mail piece at the station for sealing, advancing the mail piece to the station for weighing while the processing means therein remain activated to thereby reduce the processing time at the station for weighing;

(g) while the mail piece is undergoing weighing, activating processing means for performing the imprinting function, (h) after completion of weighing of the mail piece, subjecting the mail piece to printing while the processing means therein remain activated to thereby reduce the printing time, (i) while the mail piece is undergoing printing, activating means for removing the printed mail piece from the printing station, (j) after completion of printing, subjecting the printed mail piece to the removing means;

(k) adjusting the operating speed of the processing stations at which the mail piece is located in accordance with the size or thickness of the mail piece.

26. The method of claim 24 wherein the upstream station performs flap sealing and the downstream station performs indicia printing.

27. A method for processing mail pieces at high speed, comprising the steps:

(a) providing in the mail piece flow path processing stations for singulating, sealing, weighing and printing, (b) subjecting mail pieces to a singulating functions;

(c) while the mail piece is still at a station for singulating, activating the sealing processing mean; p1 (d) after completion of processing of the mail piece at the singulating station, advancing the mail piece to the station for sealing while the processing means therein remain activated to thereby reduce the processing time at the sealing station, (e) while the mail piece is at the station for sealing, activating processing means at the station for weighing;

(f) after completion of processing of the mail piece at the station for sealing, advancing the mail piece to the station for weighing while the processing means therein remain activated to thereby reduce the processing time at the station for weighing;

(g) while the mail piece is undergoing weighing, activating processing means for performing the printing function, (h) after completion of weighing of the mail piece, subjecting the mail piece to printing while the processing means therein remain activated to thereby reduce the printing time, (i) while the mail piece is undergoing printing, activating means for removing the printed mail piece from the printing station, (j) after completion of printing, subjecting the printed mail piece to the removing means.

28. The method of claim 27 wherein, while the removal means is removing as printed mail piece, an upstream mail piece is entering the station for weighing, being transported by the same removal means.

* * * * *

UNITED STATES PATENT AND TRADEMARK OFFICE

CERTIFICATE OF CORRECTION

PATENT NO. : 4,935,078

DATED : June 19, 1990

INVENTOR(S) : Norman J. Bergman, et al

It is certified that error appears in the above-identified patent and that said Letters Patent is hereby corrected as shown below:

On the title page, item [54] and in column 1, line 1, in the title change "MACHING" to --MACHINE--.

On the title page, item [75] Inventors: third inventor, please change "Peter C. DiLiulio" to --Peter C. DiGiulio--.

Signed and Sealed this

Twenty-eighth Day of July, 1992

*Attest:*

DOUGLAS B. COMER

*Attesting Officer*

*Acting Commissioner of Patents and Trademarks*